Oct. 6, 1925.
C. S. BUSH
1,556,073
ATTACHMENT FOR TRACTORS
Filed Dec. 17, 1923 2 Sheets-Sheet 1
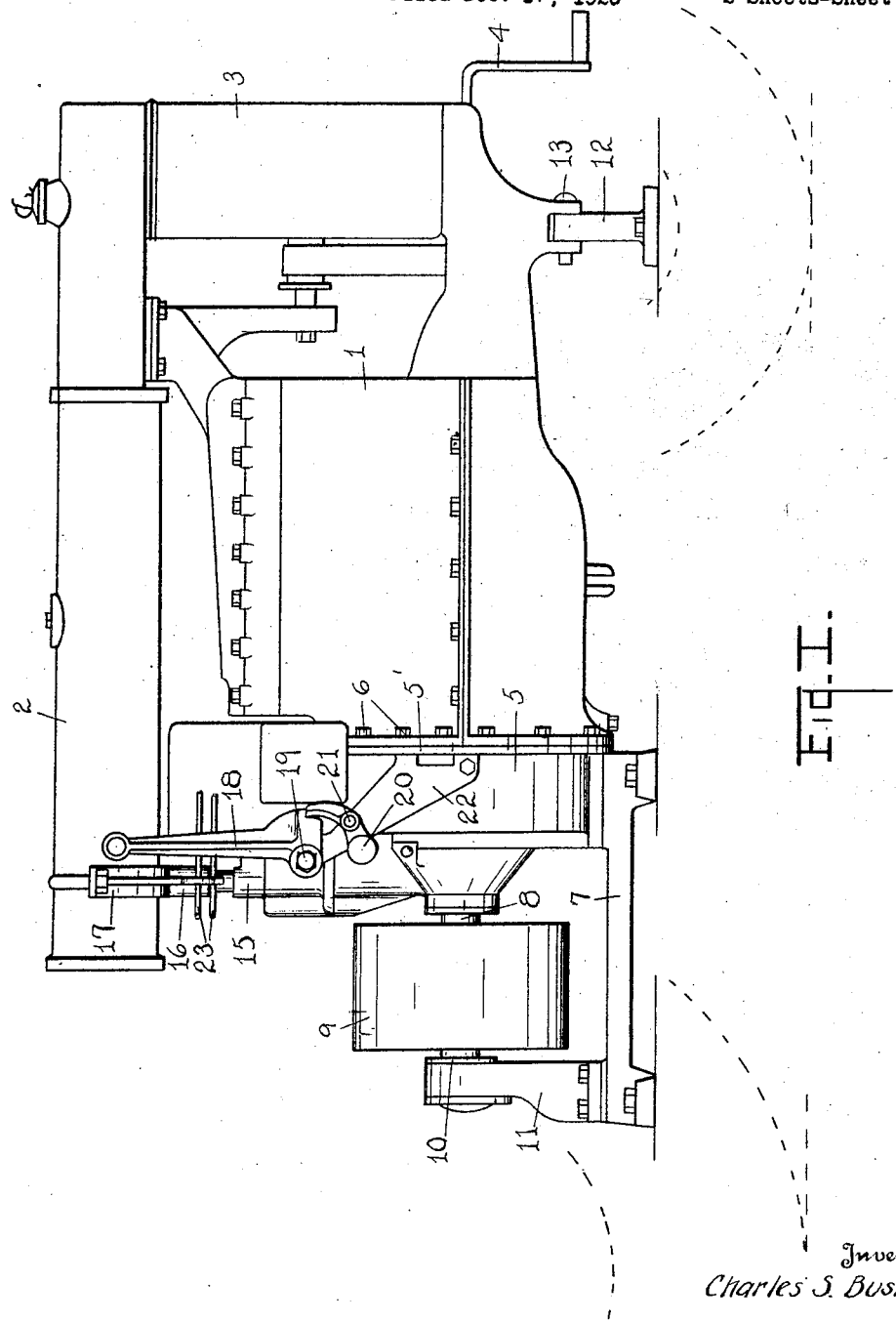
FIG. I.
Inventor
Charles S. Bush
By Chippell & Earl
Attorneys

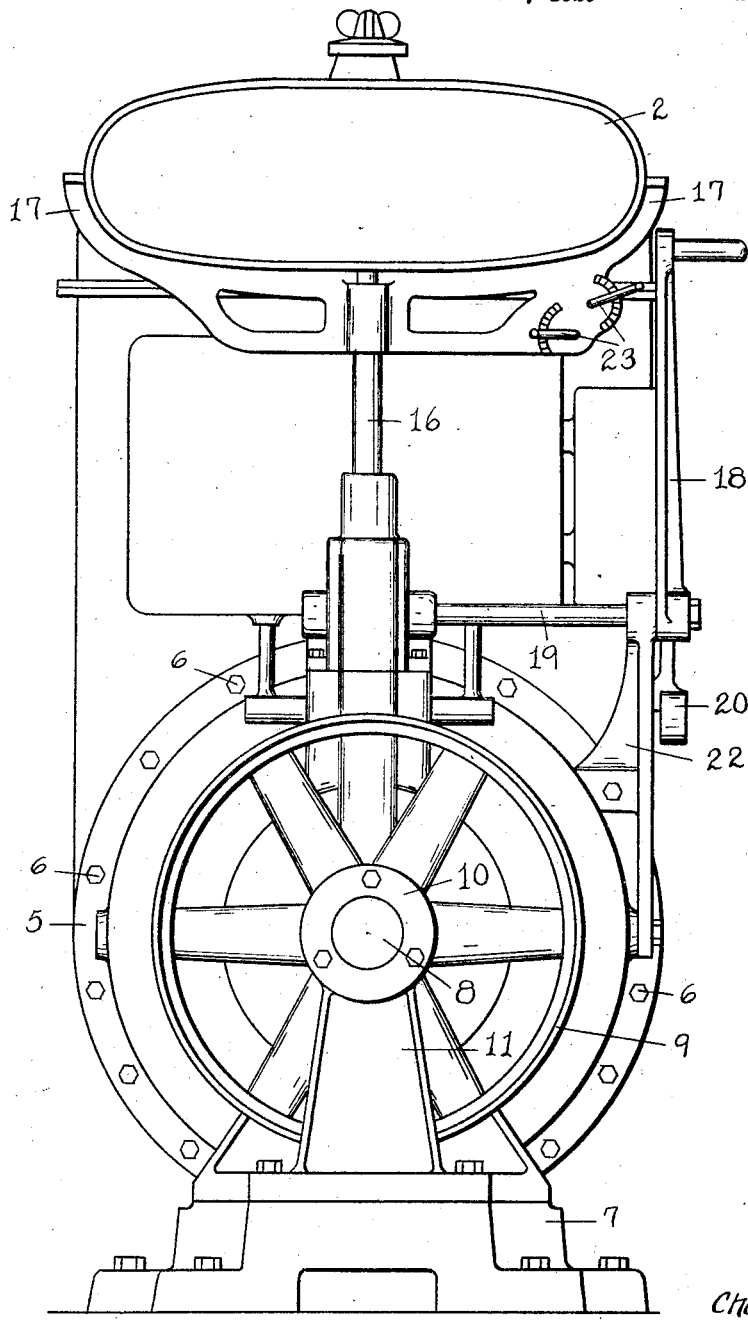

Patented Oct. 6, 1925.

1,556,073

UNITED STATES PATENT OFFICE.

CHARLES S. BUSH, OF KALAMAZOO, MICHIGAN, ASSIGNOR TO DEARBORN EQUIPMENT COMPANY, OF KALAMAZOO, MICHIGAN.

ATTACHMENT FOR TRACTORS.

Application filed December 17, 1923. Serial No. 681,298.

*To all whom it may concern:*

Be it known that I, CHARLES S. BUSH, a citizen of the United States, residing at the city and county of Kalamazoo, State of Michigan, have invented certain new and useful Improvements in Attachments for Tractors, of which the following is a specification.

This invention relates to improved attachments for a Fordson tractor to make use of the same as an ordinary stationary power plant.

The object of the invention is to provide simple and convenient supports and controls for the power plant of a Fordson tractor to make such tractor readily available as a power plant without undue waste.

Objects pertaining to details and economies of construction and operation of my improvements will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side elevation view of a Fordson power plant with my improved attachments in place, the relative position of the wheels of the Fordson tractor being indicated by dotted lines.

Fig. II is an enlarged rear end view of the parts appearing in Fig. I.

In the drawing similar numerals of reference refer to similar parts in both views. The parts of the drawing will be referred to by their numbers.

1 is the engine of a Fordson tractor, 2 is the main fuel tank thereof, 3 is the radiator, 4 the crank, all of usual form, detached from the running gear. The transmission casing has been removed and my attachment transmission casing 5 is substituted and retained in position by bolts 6 in the same way the regular Fordson transmission case is retained in place. The casing 5 embraces the Fordson fly wheel and clutch, with its control means.

A platform base 7 is provided integral with this part and on an extension 8 of the propeller shaft is provided pulley 9, supported in suitable bearing 10 on a bracket 11 on said base 7. The front running gear has been removed and a bracket 12 provided which takes the place of the front bolster and engages the front bolster pin 13 and supports the front of the engine. A bracket support 15 is provided, with post 16 carrying cross arms 17 for the fuel tank. This bracket support has a clutch lever 18 secured to the clutch rock shaft 19, which is locked in disengaged position by the weighted pawl 20 carried on pivot 21 on bracket arm 22 on the front flange 5' of the transmission case. The right hand cross arm 17 is perforated for the spark and gas control levers 23 (see Fig. II).

The power plant, it will be seen, is still readily available for use in the Fordson tractor by simply undoing the bolts 6 which disconnect the power plant so that it can be readily detached and the fly wheel and clutch be inserted in the regular casing of the Fordson tractor. The pin 13 can be withdrawn and the front axle be attached by simply swinging the parts to place and inserting the pin.

Having thus described my invention what I claim as new and desire to secure by Letters Patent is—

1. An attachment for a Fordson tractor power plant, with its fly wheel, gear clutch and casing, with projecting propeller shaft, comprising clutch and fly wheel casing attachment with supporting base platform, an extension of the propeller shaft, a driving pulley thereon, suitable journal bearing for said shaft disposed on said platform for supporting the same, clutch lever supporting brackets carried by said clutch and fly wheel casing, a clutch lever supported thereby, and a pawl latch on said bracket to hold the clutch disengaged, coacting as specified.

2. An attachment for a Fordson tractor power plant, with its fly wheel, gear clutch and casing, with projecting propeller shaft, comprising clutch and fly wheel casing attachment with supporting base platform, an extension of the propeller shaft, a driving pulley thereon, suitable journal bearing for said shaft disposed on said platform for supporting the same, clutch lever supporting brackets carried by said clutch and fly wheel casing, and a clutch lever supported thereby, coacting as specified.

3. An attachment for a Fordson tractor power plant, with its fly wheel, gear clutch and casing, with projecting propeller shaft, comprising clutch and fly wheel casing attachment with supporting base platform, an extension of the propeller shaft, a driving pulley thereon, and suitable journal bearing on said platform for supporting the same, coacting as specified.

4. An attachment for a Fordson tractor power plant, with its fly wheel, gear clutch and casing, with projecting propeller shaft, comprising clutch and fly wheel casing attachment, an extension of the propeller shaft, a driving pulley thereon, and suitable journal bearing and support for supporting the outer end of the same, coacting as specified.

In witness whereof, I have hereunto set my hand.

CHARLES S. BUSH.